United States Patent
Quarmby et al.

(10) Patent No.: US 8,857,818 B2
(45) Date of Patent: Oct. 14, 2014

(54) INTERNALLY PRESSURIZED SEALS

(75) Inventors: Nicholas Derek Quarmby, Manchester (GB); Bhikhubhai Chhanabhai Patel, Ashton-Under-Lyme (GB)

(73) Assignee: John Crane UK Limited, Slough (GB)

( * ) Notice: Subject to any disclaimer, the term of this patent is extended or adjusted under 35 U.S.C. 154(b) by 454 days.

(21) Appl. No.: 12/935,752

(22) PCT Filed: Mar. 23, 2009

(86) PCT No.: PCT/GB2009/000765
§ 371 (c)(1),
(2), (4) Date: Dec. 13, 2010

(87) PCT Pub. No.: WO2009/122131
PCT Pub. Date: Oct. 8, 2009

(65) Prior Publication Data
US 2011/0084454 A1    Apr. 14, 2011

(30) Foreign Application Priority Data
Apr. 1, 2008  (GB) .................................... 0805864.6

(51) Int. Cl.
*F16J 15/34*    (2006.01)

(52) U.S. Cl.
CPC ............ *F16J 15/3404* (2013.01); *F16J 15/348* (2013.01)
USPC .......................................... 277/306; 277/307

(58) Field of Classification Search
USPC ......... 277/358, 359, 360, 404, 407, 408, 370, 277/371, 375
See application file for complete search history.

(56) References Cited

U.S. PATENT DOCUMENTS

| | | | | |
|---|---|---|---|---|
| 3,272,519 A | * | 9/1966 | Voitik | 277/380 |
| 3,392,984 A | * | 7/1968 | Reinsma et al. | 277/380 |
| 3,547,452 A | * | 12/1970 | Hirata | 277/358 |
| 4,335,888 A | | 6/1982 | Ohba et al. | |
| 4,418,919 A | * | 12/1983 | Wentworth | 277/371 |
| RE32,646 E | * | 4/1988 | Wentworth | 277/371 |
| 4,754,981 A | * | 7/1988 | Burns | 277/374 |
| 5,224,714 A | * | 7/1993 | Kimura et al. | 277/400 |

(Continued)

FOREIGN PATENT DOCUMENTS

DE   202 14 529 U1   8/2003
EP   1 288 542 A2    3/2003

(Continued)

*Primary Examiner* — Kristina Fulton
*Assistant Examiner* — Eugene G Byrd
(74) *Attorney, Agent, or Firm* — Davis & Bujold, PLLC; Michael J. Bujold (57) ABSTRACT

A seal assembly having a first seal ring sealed to a rotatable component and a second seal ring sealed to another rotatable component, and the second ring is urged towards the first ring such that sealing faces of the seal rings engage. A process chamber is formed inside the seal rings and opens to an outside the seal rings, and a barrier chamber outside of the seal rings opens to inside the seal rings. A shroud shields the external surface of the seal rings from process fluid in the process chamber such that heat transfer from the process fluid to the seal rings occurs at outer regions of the seal rings adjacent the sealing faces, and a sleeve is secured inside the seal rings such that heat transfer between the seal rings and barrier fluid in the barrier chamber occurs at radially extending surfaces of the seal rings adjacent the sealing faces.

15 Claims, 3 Drawing Sheets

(56) References Cited

U.S. PATENT DOCUMENTS

| | | | |
|---|---|---|---|
| 5,934,683 A | 8/1999 | Sieghartner | |
| 6,338,489 B1 * | 1/2002 | Nakano | 277/385 |
| 6,371,488 B1 * | 4/2002 | Szymborski et al. | 277/365 |
| 6,398,223 B1 * | 6/2002 | Radosav | 277/352 |
| 6,517,077 B1 * | 2/2003 | Enomura | 277/358 |
| 6,708,980 B2 | 3/2004 | Takahashi | |
| 7,001,565 B2 * | 2/2006 | Phelan et al. | 264/516 |
| 7,431,303 B2 * | 10/2008 | Dahlheimer | 277/359 |
| 7,870,654 B2 * | 1/2011 | Kametaka et al. | 29/450 |
| 8,231,130 B2 * | 7/2012 | Takahashi | 277/375 |
| 2004/0046322 A1 * | 3/2004 | Berard | 277/370 |
| 2004/0150166 A1 * | 8/2004 | Takahashi | 277/370 |
| 2004/0227298 A1 * | 11/2004 | Azibert | 277/370 |
| 2005/0242515 A1 * | 11/2005 | Brooks et al. | 277/370 |
| 2006/0103074 A1 * | 5/2006 | Droscher et al. | 277/370 |

FOREIGN PATENT DOCUMENTS

| | | |
|---|---|---|
| EP | 1 375 984 A1 | 1/2004 |
| GB | 2 008 690 A | 6/1979 |
| GB | 1 596 804 | 9/1981 |
| JP | 57157864 A | 9/1982 |
| WO | 2004/029489 A1 | 4/2004 |
| WO | WO2006/137305 * | 12/2006 |

* cited by examiner

INTERNALLY PRESSURIZED SEALS

This application is a national stage completion of PCT/GB09/000765 filed Mar. 23, 2009 which claims priority from Great Britain application serial no. 0805864.6 filed Apr. 1, 2008.

FIELD OF THE INVENTION

The present invention relates to internally pressurized seals and in particular to internally pressurized high duty, high pressure mechanical face seals.

BACKGROUND OF THE INVENTION

Conventional mechanical face seals are externally pressurized, so that the pressure is applied to the outside of the seal rings and the rings are under compression. In particular for high pressure applications, a barrier fluid at a pressure in excess of the product fluid is applied to the outside of the seal rings, while the interior of the rings is exposed to the process fluid. In this manner any leakage across the sealing faces will be of the barrier fluid, which is at higher pressure, into the process fluid, so that pollution of the environment is avoided. Even with externally pressurized seals of this type, the seal rings must be capable of withstanding internal pressures in emergencies, for example if subjected to reverse pressurization upon failure of the barrier fluid pressure.

It has consequently been proposed the reinforce the seal rings on their external periphery, for example as disclosed in EP 1375984 the disclosure of which is incorporated herein with reference thereto, in order to increase the internal pressures which the seal rings are capable of withstanding. Such composite seals are typically capable of withstanding internal pressures up to 250 bar.

While externally pressurized seals of the type disclosed above are suitable for many applications, in some circumstances it is desirable to expose the outside of the seal rings to process fluid, while the barrier fluid of applied internally of the seal rings. For example, when the process fluid contains solids, with externally pressurized seals where the process fluid is on the inside of the seal rings, the solids will be centrifuged into contact with the seal rings and associated components, clogging the components and causing the seal to hang and allowing leakage across the seal. When the process fluid is outside the seal rings, the solids will be centrifuged away from the seal rings and associated components.

Composite seals of the type disclosed above will allow internal pressurization. However the use of such composite rings with internal pressurization does present problems due to thermal distortion of the seal rings. With rings of this type, as the temperature of the sealing faces increases, the thermal gradient across the seal ring will cause the ring to distort so that the sealing face rotates outwardly. As a result of thermal distortion of the opposed seal rings, the gap between the sealing faces will increase from inside to outside.

When the barrier fluid is on the outside of the seal, this is not a problem, as the opening of the gap will increase the hydrostatic opening force in the barrier fluid between the sealing faces, which will reduce generated heat, maintaining equilibrium. In this manner, with external pressurization the effect of thermal distortion is inherently stabilized. However with internal pressurization, when the barrier fluid is on the inside of the seal rings, narrowing of the gap on the inside of the seal will reduce hydrostatic support, thereby increasing friction between the faces and generating a hot spot. Lapping of the sealing faces so that they are rotated inwardly when the seal rings are cold, will produce unacceptably high leakage rates at start-up when the pressure differential between the barrier fluid and process fluid is likely to be at its greatest. Moreover, even if the faces are lapped in this manner, as the faces heat up, the gap will reduce on the inside, reducing leakage and increasing thermal distortion. As a consequence thermal distortion of the rings cannot be stabilized in conventional manner. While it is possible to design seal rings which do rotate inwardly as the temperature gradient increases, such seal rings would not be suitable for internal pressurization which requires a ring of large radial section in order to withstand internal pressurization, even when reinforced externally.

The present invention provides an internally pressurized seal in which thermal distortion is stabilized.

According to one aspect of the present invention, an internally pressurized seal assembly comprises a first seal ring mounted in fixed axial and rotational relationship and sealed with respect to one of a pair of relatively rotatable components and a second seal ring moveable axially but fixed rotationally and sealed with respect to the other of the pair of relatively rotatably components, the second seal ring being urged resiliently towards the first seal ring, so that a radial sealing face of the first seal ring engages a radial sealing face of the second seal ring, a process chamber being formed at the inboard side of the seal rings, said process chamber opening to the outside of the seal rings, and a barrier chamber being provided at the outboard side of the seal rings, the barrier chamber opening to the inside of the seal rings, the external circumferential surface of the seal rings being shielded from process fluid in the process chamber by shroud members which ensure that heat transfer from the process fluid to the seal rings predominantly occurs at the outer regions of the seal rings adjacent the sealing faces, and a sleeve being secured internally of each seal ring which ensure that heat transfer between the seal rings and a barrier fluid in the barrier chamber predominantly occurs at the radially extending surfaces of the seal rings adjacent the sealing faces.

By concentrating heat transfer to and from the seal rings to the portions of the seal rings adjacent the sealing faces, in the manner described above, the temperature gradients in the seal rings, which results in rotation of the sealing faces due the thermal distortion, are significantly reduced, thereby reducing rotation of the sealing faces and minimizing the reduction in hydrostatic support.

According to a further embodiment of the invention hydrodynamic features are provided in the sealing face of one of the seal rings, these hydrodynamic features being in the form of grooves or recesses, which open to the internal periphery of the sealing faces. If heat generation at the sealing faces is increased the sealing faces rotate such that the gap between the sealing faces will increase inside to outside, this brings the hydrodynamic features into closer proximity to the other sealing face, increasing hydrodynamic support and reducing generated heat. In this manner with internal pressurization the effect of thermal distortion is further stabilized.

According to a further aspect of the present invention, a method of thermally stabilizing an internally pressurized seal having a first seal ring mounted in fixed axial and rotational relationship and sealed with respect to one of a pair of relatively rotatable components and a second seal ring moveable axially but fixed rotationally and sealed with respect to the other of the pair of relatively rotatably components, the second seal ring being urged resiliently towards the first seal ring so that a radial sealing face of the first seal ring engages a radial sealing face of the second seal ring, a process chamber being formed at the inboard side of the seal rings, said process chamber opening to the outside of the seal rings, and a barrier chamber being provided at the outboard side of the seal rings, the barrier chamber opening to the inside of the seal rings, the method comprises ensuring that heat transfer from a process fluid in the process chamber to the seal rings predominantly occurs at the outer regions of the seal rings adjacent the sealing faces and ensuring that heat transfer between the seal rings and a barrier fluid in the barrier chamber predominantly occurs at the radially extending faces of the seal rings adjacent the sealing faces.

BRIEF DESCRIPTION OF DRAWINGS

The invention is now described, by way of example only, with reference to the accompanying drawings, in which.

DETAILED DESCRIPTION OF DRAWINGS

The accompanying drawings illustrate a seal assembly 10 for providing a seal between a shaft 12 and housing 14.

Figure 1:
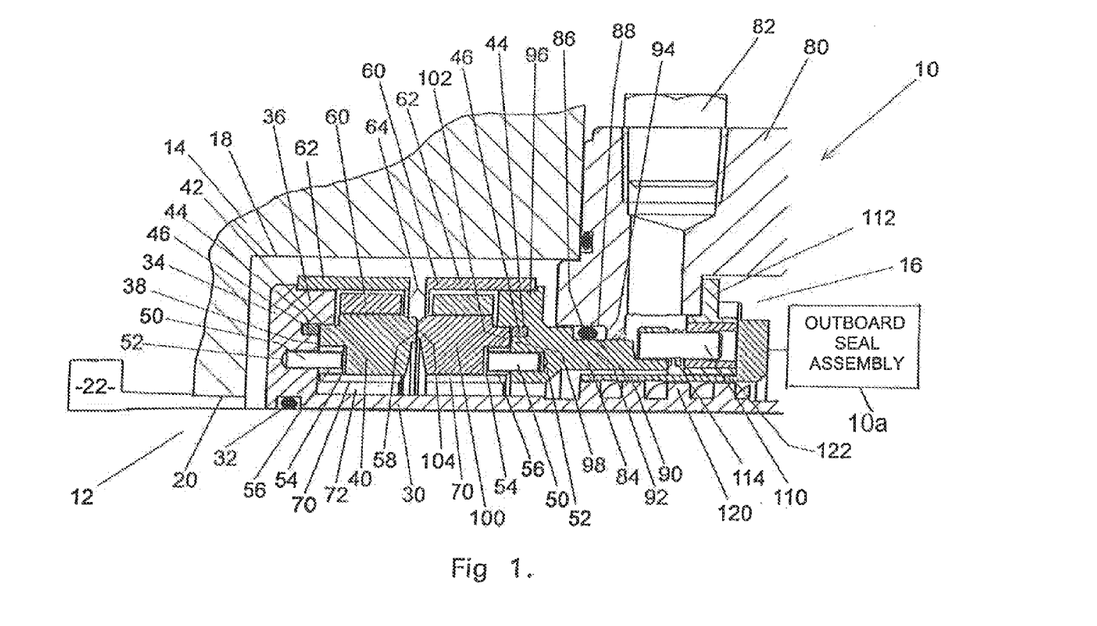
FIG. 1 is a partial sectional elevation of a seal assembly in accordance with the present invention.

FIG. 1 shows an inboard seal assembly 10 of a multiple seal assembly, the multiple seal assembly having an outboard seal assembly 10a (shown only diagrammatically) outboard of the inboard seal assembly 10. A barrier chamber 16 being defined between the inboard seal assembly 10 and the outboard seal assembly 10a. The outboard seal assembly 10a may be of conventional design and is preferably externally pressurized. However where the operating conditions warrant, an internally pressurized seal of design similar to seal assembly 10, may be used for the outboard seal assembly 10a.

The seal assembly 10 is secured to the housing 14 of a pump or similar machine, which is driven by the shaft 12. The seal assembly 10 is located, in part, in an enlarged diameter outwardly opening portion 18 of a bore 20 in the housing 14, through which the shaft 12 is mounted coaxially of the bore 20. The bore 20 opens on the inside of the housing 14 to a process chamber 22 in which process fluid under pressure is contained, during operation of the machine.

The seal assembly 10 comprises a sleeve member 30, which is mounted on the shaft 12 for rotation therewith, the sleeve member 30 being sealed with respect to the shaft 12 by means of an elastomeric O-ring or similar sealing element 32. The inner end of sleeve member 30 is provided with a flange formation 34, which when the seal assembly is installed will be disposed in the enlarged diameter portion 18 of bore 20. A cylindrical extension 36 extends axially outwardly from the outer face of flange formation 34 about the outer periphery of the flange formation 34, to define an annular recess 38.

A first seal ring or mating ring 40 has an end portion 42 of reduced external diameter which engages the recess 38 to radially locate the mating ring 40 with respect to the flange formation 34, the inner periphery of the mating ring 40 being spaced radially from the sleeve member 30. An annular axially extending groove 44 is provided in the base of recess 38, around its outer periphery. An elastomeric support ring 46 is located in the groove 44 and is compressed by axial loading of the mating ring 40 to provide a seal and to spread axial loads evenly about the mating ring 40 thereby avoiding mechanical distortion of the mating ring 40. A plurality of drive pins 50 are located in axial bores 52 in the base of the recess 38, at angularly spaced locations, the drive pins 50 engaging corresponding bores 54 in the adjacent end face of mating ring 40. Bushes 56 are provided in the bores 54 in order to avoid chipping of the mating ring during start-up or speed fluctuations.

The end of the mating ring 40 remote from the flange formation 34 defines an annular radial sealing face 58, the sealing face 58 being stepped axially away from the body of the mating ring 40, the diameter of the outer periphery of the sealing face 58 being smaller than the diameter of the outer periphery of mating ring 40 and the diameter of the inner periphery of the sealing face 58 being greater than the diameter of the inner periphery of mating ring 40. The outboard end face of the mating ring 40 inwardly of the sealing face 58 is inclined toward the inboard end of the mating ring 40, from the sealing face 58 to the internal periphery of the mating ring 40.

A carbon fiber composite reinforcing ring 60, as describe in EP 1375984 is mounted about the outer periphery of the mating ring 40 to withstand internal pressures in excess of 250 bar.

A shroud member 62 is secured to the flange formation 34 and extends coaxially of the mating ring 40. An inwardly directed flange formation 64 at the outboard end of the shroud member 62 extends into close proximity to the external diameter of the mating ring 40 adjacent the sealing face 58. A clearance is provided between the mating ring 40 and the shroud member 62 and flange formation 64 in order to accommodate expansion of the mating ring 40. The clearance between the flange formation 64 and mating ring 40 is preferably smaller than that between the shroud member 62 and mating ring 40, so that any particles entering the gap between the flange formation 64 and mating ring 40 are unlikely to clog the wider gap between the shroud member 62 and mating ring 40. The shroud member 62 is made of a material of relatively low thermal conductivity, for example stainless steel.

A sleeve 70 of thermally insulative material, for example a polyaryletheretherketone plastics material commercially available as PEEK™ from Victrex plc. is applied to the inner peripheral surface of the mating ring 40. The mating ring 40 and sleeve 70 are dimensioned to provide a gap 72 between the sleeve member 30 and internal diameter of sleeve 70.

A gland plate 80 is secured to the housing 14 coaxially of the bore 20, in conventional manner, for example by means of a series of angularly spaced bolts. The gland plate 80 defines an inlet 82 by which a barrier fluid may be introduced into the barrier chamber 16.

A carrier ring 84 is slidably mounted in a stepped bore 86 of the gland plate 80. The carrier ring 84 is sealed with respect to the gland plate 80 by means of an elastomeric O-ring or similar secondary sealing element 86, which is located between an enlarged diameter inner end portion 88 of bore 86 and a recess 90 on the external periphery of carrier ring 84 at its outer end. The elastomeric O-ring 86 is thereby located axially between a radial face 92 defined by the inner end of recess 90 and a radial face 94 defined by the outer end of the enlarged diameter portion 88 of bore 86.

The inner end 96 of carrier ring 84 is of increased external diameter and has and axial recess 98. A second seal ring or primary ring 100 is mounted in recess 98, in similar manner to the mounting of mating ring 40 in recess 38, an outer end portion 102 of primary ring 100 being of reduced external diameter, which engages the recess 98 to radially locate the primary ring 100 with respect to the carrier ring 84. The primary ring 100 is also sealed to the carrier ring 84 in similar manner to the mating ring 40, having an elastomeric support ring 46 located in the an axially extending groove 44 in the base of the recess 98. A plurality of drive pins 50 are also provided to prevent rotation of the primary ring 100 relative to the carrier ring 84.

The primary ring 100 is of similar construction to the mating ring 40 having a carbon fiber composite reinforcing ring 60 mounted about its outer periphery and a sleeve 70 of thermally insulative material is applied to the inner peripheral surface of the primary ring 100. A shroud member 62, 64 is also secured to the carrier ring 84 to shield the primary ring 100.

Also as with the mating ring 40, the inboard end face of the primary ring 100 inwardly of a sealing face 104 is inclined towards the outboard end of the primary ring 100, from the sealing face 104 to the internal periphery of the primary ring 100.

The primary ring 100 differs from the mating ring 40 in that the sealing face 104 is narrower than the sealing face 58 of mating ring 40, the diameter of the outer periphery of sealing face 104 being smaller than the diameter of the outer periphery of sealing face 58 and the diameter of the inner periphery of the sealing face 104 being greater than the diameter of the inner periphery of sealing face 58.

Figure 2:
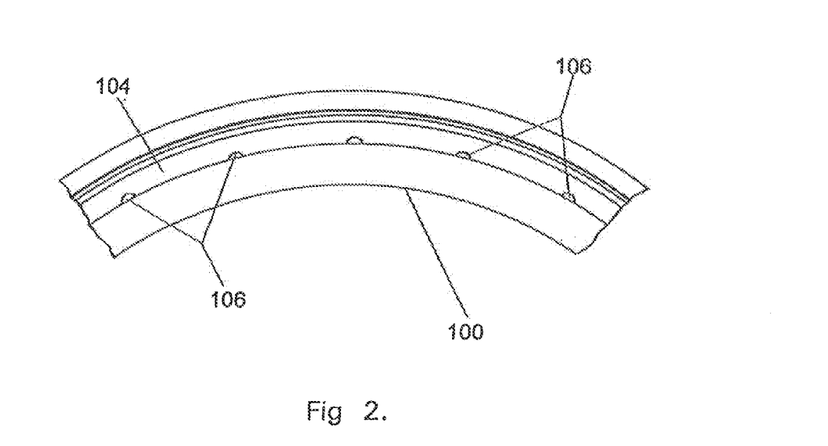
FIG. 2 is perspective view of the sealing face of a seal ring used in the seal assembly shown in FIG. 1.

A plurality of shallow segmental recesses 106 are provided at angularly spaced locations about the inner periphery of the sealing face 104, the recesses 106 opening to the inner peripheral edge of the stepped sealing face 104, so that the recesses 106 are open to the interior of primary ring 100.

A plurality of drive pins 110 are located at angularly spaced locations and engage bores in the outboard end of carrier ring 84 and an inner gland ring 112 secured coaxially of gland plate 80.

A plurality of helical compression springs 114 are located at angularly spaced locations, in axially aligned pockets, in the outboard end of carrier ring 84 and the opposed radial face of gland ring 112, the springs 114 resiliently urging the carrier ring 84 towards the mating ring 40 and the sealing face 104 of primary ring 100 into sealing engagement with sealing face 58 of mating ring 40.

The sleeve member 30 extends axially coaxially of the gland plate 80, a portion of the sleeve member 30 surrounded by gland plate 80 defining a scroll formation 120 which will pump barrier fluid in barrier chamber 16 towards the outboard side of the barrier chamber 16. A sleeve member 122 is mounted on the internal diameter of gland ring 112 and has a close clearance with the scroll formation 120.

With the seal assembly 10 described above, the seal assembly in use will be exposed to process fluid from the process chamber 22, externally of the mating and primary rings 40, 100. Barrier fluid at a pressure of up to 250 bar is introduced into the barrier chamber 16, so that the mating and primary rings 40, 100 are exposed to the barrier fluid internally. Typically the pressure of the barrier fluid will be 25 bar above the peak operational process fluid pressure.

The sealing faces 58, 104 are lapped to provide controlled leakage of the barrier fluid in barrier chamber 16 across the sealing faces 58, 104 and provide lubrication and cooling of the sealing faces. In addition, the segmental recesses 106 on the inner periphery of seal face 100 will induce leakage across the sealing faces in controlled manner, to further lubricate and cool the sealing faces 58, 104 and oppose thermal distortion of the mating and primary rings 40, 100, without excessive leakage.

Figure 3:
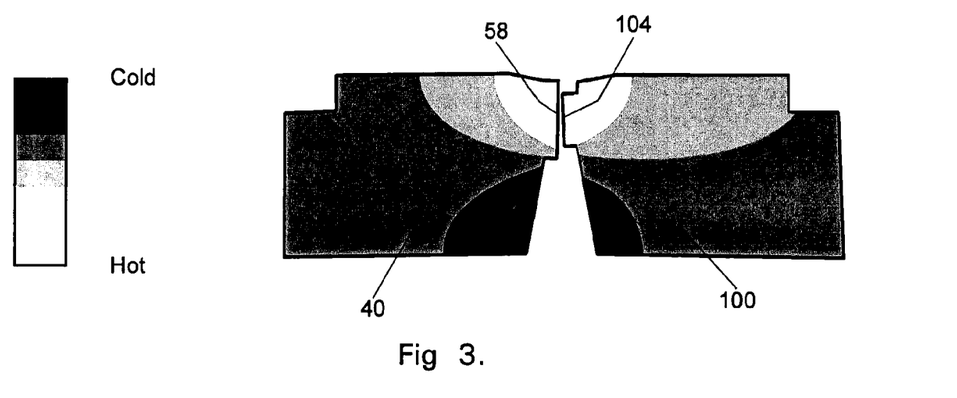
FIG. 3 is a typical thermal map illustrating the thermal gradients of the seal rings of the seal assembly in accordance with the present invention.
Figure 4:
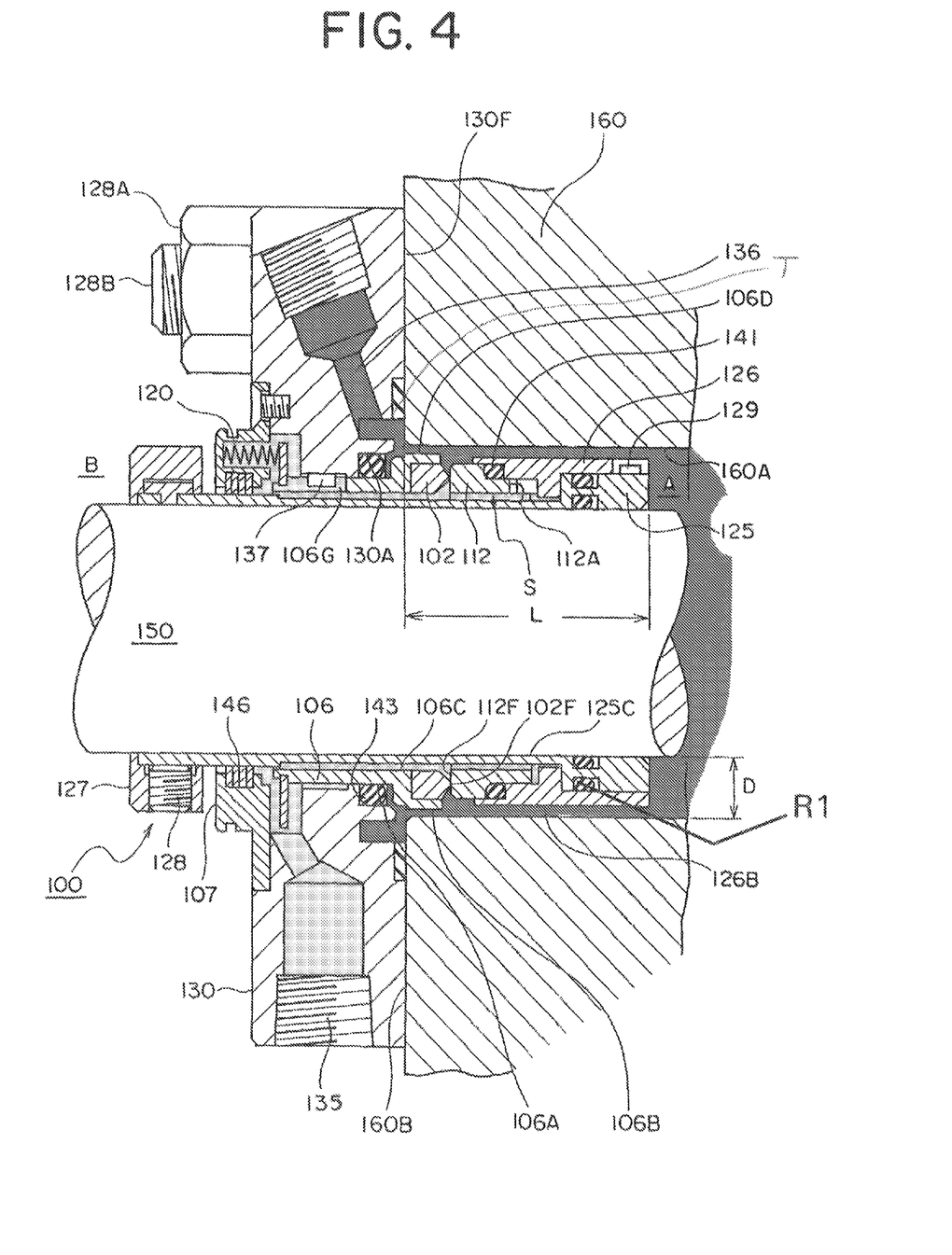
FIG. 4 is a typical thermal map, similar to FIG. 3, for seal rings where transfer of heat between the seal rings and the process and boundary fluids are not controlled.

The shroud members 62 shield the mating and primary rings 40, 100 from heat transfer from the process fluid on the outside, while the insulating sleeves 70 restrict cooling of the mating and primary rings 40, 100 by the barrier fluid, to the faces thereof adjacent the sealing faces. As a consequence the thermal gradients across the mating and primary rings 40, 100 are substantially concentrated adjacent the sealing faces, as illustrated in FIG. 3, rather than distributed throughout the mating and primary rings 40, 100, as illustrated in FIG. 4, as would be the case if the mating and primary rings 40, 100 were fully exposed to the process fluid on the outside and barrier fluid in the inside. By controlling heat transfer in this manner, the thermal distortion of the mating and primary rings 40, 100 is reduced, maintaining the gap between the sealing faces 58, 104 on the internal diameter of the sealing faces 58, 104.

With the seal assembly 10 described above, during operation centrifugal effects will increase the pressure of the barrier fluid in the gap between the faces of the mating and primary rings 40, 100 adjacent the sealing faces 58, 104, which will tend to blow the mating and primary rings 40, 100 apart. To prevent the sealing faces 58, 104 from being opened, the loads applied by the springs 114 are increased in order to ensure that increase in barrier fluid pressure is opposed. The hydrodynamic effect of the segmental grooves 106 will accommodate the increased spring load when the shaft is rotating at speed. In order to minimize the centrifugal effects the gap 72 between the mating and primary rings 40, 100 and sleeve member 30 is minimized to reduce the amount of barrier fluid inside the mating and primary rings 40, 100, whilst maintaining sufficient turbulence to provide adequate cooling of the faces of the mating and primary rings 40, 100, adjacent the sealing faces 58, 104. The heat transferred to the barrier fluid inside the mating and primary rings 40, 100 is removed by circulation of the barrier fluid in the outboard end of the barrier chamber 16 by means of the scroll formation 120.

The mounting of the drive pins 50 in bushes 56 will avoid chipping of the mating and primary rings 40, 100 when subject to high torque at start up, due to the increased spring load.

The seal assembly 10 disclosed above is particularly suitable for use with process fluids with solids contents, when any solids entering the gap outside the mating and primary rings 40, 100 will be centrifuged away from the mating and primary rings 40, 100 and also the secondary sealing element 86, thereby avoiding seal hang-up. Moreover the springs 114 are not exposed to the process fluid and cannot consequently be clogged by solids in the process fluid. A further advantage of the present seal assembly 10 is that the radial gaps between the carrier ring 48 and gland plate 80; between the flange formations 64 of shroud members 64; and between the sleeve 30 and housing 14; all open to their outer periphery, so that any solids entering these gaps will fall out of the gaps.

Various modifications may be made without departing from the invention, for example instead of the segmental recesses 106 in the sealing face 104 of the primary ring 100, hydrodynamic grooves or recesses of other configurations may be provided on the inner periphery of the sealing face 58, 104 of either of the mating or primary rings 40, 100.

The invention claimed is:

1. An internally pressurized seal assembly in combination with a housing and a shaft, the seal assembly providing a seal between the shaft and the housing, the housing defining a relatively lower pressure process chamber in which a relatively lower pressure process fluid is contained, the internally pressurized seal assembly being mounted between concentric surfaces of the shaft and the housing, the internally pressurized seal assembly comprising:

an inboard side that is adjacent the relatively lower pressure process chamber and an outboard side that is remote from the relatively lower pressure process chamber, the inboard and the outboard sides of the seal assembly being axially opposite one another;

a first seal ring being fixed to a flange of a sleeve member which is supported by the shaft and the first seal ring being sealed with respect to the shaft, and the first seal ring having an annular sealing surface that extends radially and faces the outboard side of the first seal ring, the first seal ring having an inner surface that is radially spaced from the sleeve member;

a second seal ring being fixed to a carrier ring and sealed with respect to the housing, the second seal ring being located on the outboard side of the first seal ring and having an annular sealing surface that extends radially and faces the first seal ring which is located on the inboard side of the second seal ring, the second seal ring having an inner surface that is radially spaced from the sleeve member, and the inner surfaces of the first and the second seal rings and the sleeve member defining a relatively higher pressure gap, outer surfaces of the first and the second seal rings being radially spaced from an inner surface of the housing defining a relatively lower pressure process chamber extension that is open to the relative lower pressure process chamber;

a resilient means located between one of the first seal ring and the housing, and the second seal ring and the shaft to urge said one of the first and the second seal rings axially towards the other of the first and the second seal rings such that the annular sealing surface of the first seal ring sealingly engages the annular sealing surface of the second seal ring to form a seal between the annular sealing surfaces of the first and the second seal rings and prevent leakage of the relatively lower pressure process fluid in the relatively lower pressure process chamber extension radially inwardly to the relatively higher pressure gap defined between the inner surfaces of the first and the second seal rings and the sleeve member;

an inlet being located on an outboard side of the second seal ring communicates with the relatively higher pressure gap, the inlet being connected to a source of barrier fluid at a pressure in excess of the pressure of the process fluid in the relatively lower pressure process chamber, such that a relatively higher pressure barrier fluid is introduced into the relatively higher pressure gap to communicate with inner surfaces of the first and the second seal rings, the relatively lower pressure process fluid and the relatively higher pressure barrier fluid cooperating with one another so as to only permit the relatively higher pressure barrier fluid to flow radially outwardly from the relatively higher pressure gap past the first and the second seal rings and into the relatively lower pressure process chamber and the process chamber extension and prevent leakage of the relatively lower pressure process fluid radially inwardly to the relatively higher pressure gap;

a thermal shroud member is supported by the flange of the sleeve member and extends axially toward the outboard side of the first seal ring and another thermal shroud member is supported by the carrier ring and extends axially toward the inboard side of the second seal ring, axially adjacent ends of the shroud members have flange formations, the flange formations extend radially inward from the respective shroud member toward the respective outer surface of the first and the second seal rings, the shroud members restricting communication between the relatively lower pressure process fluid in the relatively lower pressure process chamber extension and the outer surfaces of the first and the second seal rings to adjacent the annular sealing surfaces; and thermally insulative sleeves being secured to the respective inner surfaces of the first and the second seal rings so as to shield the inner surfaces of the first and the second seal rings from communicating with the relatively higher pressure barrier fluid, the thermally insulative sleeves being spaced from the sleeve member.

2. The internally pressurized seal assembly according to claim 1, wherein at least one of the first and the second seal rings are reinforced radially by a reinforcing ring mounted on the outer surface thereof.

3. The Internally pressurized seal assembly according to claim 2, wherein the reinforcing ring is a carbon fiber composite ring.

4. The internally pressurized seal assembly according to claim 1, wherein the thermal shroud members are spaced from the outer surfaces of the first and the second seal rings and the reinforcing rings, and each of the thermal shroud members is made of a material of relatively low thermal conductivity and shields the first and the second seal rings from heat transfer from the relatively lower pressure process fluid.

5. The internally pressurized seal assembly according to claim 4, wherein the shroud members are formed from stainless steel.

6. The internally pressurized seal assembly according to claim 1, wherein the thermally insulative sleeves are formed from a polyaryletheretherketone plastics material.

7. The internally pressurized seal assembly according to claim 1, wherein hydrodynamic features are provided on an inner periphery of the annular sealing surface of at least of one of the first and the second seal rings.

8. The internally pressurized seal assembly according to claim 7, wherein the hydrodynamic features comprise one of recesses and grooves in one of the annular sealing surface, and the one of the recesses and the grooves open to inside of the first and the second seal rings.

9. The internally pressurized seal assembly according to claim 7, wherein a plurality of segmental recesses are provided at a plurality of angularly spaced locations about the inner periphery of the annular sealing face of at least one of the first and the second seal rings.

10. The internally pressurized seal assembly according to claim 1, wherein the shaft is mounted coaxially inside the first and the second seal rings, a volume of the relatively higher pressure gap between the inner surfaces of the first and the second seal rings and the sleeve member is minimized to reduce centrifugal pressurization of the internally pressurized seal assembly while maintaining adequate cooling of the annular sealing surfaces by the relatively higher pressure barrier fluid.

11. The internally pressurized seal assembly according to claim 1, further comprising a means for inducing circulation of the relatively higher pressure barrier fluid in the relatively higher pressure gap which is open to a relatively higher pressure barrier chamber.

12. The internally pressurized seal assembly according to claim 1, wherein a rear face of at least one of the first and the second seal rings engages an elastomeric support ring, and the elastomeric support ring transmits axial loads evenly to the at least one of the first and the second seal rings and provides a seal with the elastomeric support ring.

13. The internally pressurized seal assembly according to claim 1, wherein a plurality of drive pins prevent relative rotation between each of the first and the second seal rings and the respective flange of the sleeve member and the carrier ring, and the plurality of drive pins engage within a plurality of bushes, mounted in the first and the second seal rings.

14. An internally pressurized seal assembly for providing a seal between a shaft and a housing, the housing defining a relatively lower pressure process chamber which contains a relatively lower pressure process fluid, the internally pressurized seal assembly being mounted between concentric surfaces of the shaft and the housing, the internally pressurized seal assembly having an inboard side adjacent the relatively lower pressure process chamber and an outboard side remote from the relatively lower pressure process chamber, the internally pressurized seal assembly comprising:

a first seal ring being fixed to a flange of a sleeve element, which is fixed in a rotationally fixed manner to the shaft, and sealed with respect to the shaft, and the first seal ring having an annular sealing face on a radially extending surface on the outboard side of the first seal ring;

a second seal ring being fixed to a carrier ring, which is fixed to the housing, and sealed with respect to the housing, the second seal ring being located on the outboard side of the first seal ring and having an annular sealing face on a radially extending surface on the inboard side of the second seal ring;

a resilient means urging one of the first and the second seal rings axially towards the other of the first and the second seal rings so that the annular sealing face of the first seal ring sealingly engages the annular sealing face of the second seal ring, such that outer surfaces of the first and the second seal rings are exposed to the relatively lower pressure process fluid in a relatively lower pressure process chamber extension that is open to the relatively lower pressure process chamber, the relatively lower pressure process chamber extension being defined by the housing and the outer surfaces of the first and the second seal rings, and a seal formed between the annular sealing faces of the first and the second seal rings prevents leakage of the relatively lower pressure process fluid radially inward from the relatively lower pressure process chamber extension to inner surfaces of the first and the second seal rings;

an inlet being provided on the outboard side of the second seal ring, the inlet being connected to a source of barrier fluid at a pressure in excess of the pressure of the process fluid in the relatively lower process chamber, so that a relatively higher pressure barrier fluid is introduced to the inner surfaces of the first and the second seal rings, the relatively higher pressure barrier fluid having a pressure that is higher relative to a pressure of the relatively lower pressure process fluid;

the outer surfaces of the first and the second seal rings being substantially shielded from the relatively lower pressure process fluid in the relatively lower pressure process chamber extension by first and second shroud members such that heat transfer from the relatively lower pressure process fluid to the first and the second seal rings occurs at the outer surfaces of the first and the second seal rings adjacent the annular sealing faces;

inner sleeves formed from a thermally insulative material, being respectively secured to inner surfaces of the first and the second seal rings, the inner sleeves shielding the inner surfaces of the first and the second seal rings from the relatively higher pressure barrier fluid in the gap, the inner sleeves being radially spaced from the sleeve element; and the first and the second shroud members are formed from a thermally insulative material, one end of the first shroud member is fixed to the flange of the sleeve element and extends axially therefrom such that the first shroud member is radially spaced from the first seal ring, an opposite axial end of the first shroud member has a flange formation that extends radially inward toward the first seal ring to limit the relatively lower pressure process fluid from passing into a space radially between the first shroud member and the first seal ring; and one end of the second shroud member is fixed to the carrier ring and extends axially therefrom such that the second shroud member is radially spaced from the second seal ring, an opposite axial end of the second shroud member has a flange formation that extends radially inward toward the second seal ring to limit the relatively lower pressure process fluid from passing into space radially between the second shroud member and the second seal ring.

15. An internally pressurized seal assembly for providing a seal between a shaft and a housing, the housing defining a process chamber which contains a process fluid, the seal assembly being mounted between concentric surfaces of the shaft and the housing, the seal assembly comprising:

an inboard side adjacent the process chamber and an outboard side axially remote from the process chamber;

an inboard seal assembly, the inboard seal assembly having, a first seal ring that is mounted on the inboard side of the seal assembly in fixed rotational relationship and sealed with respect the shaft, the first seal ring having an annular sealing face on a radially extending face on the outboard side of the seal ring;

a second seal ring that is mounted on the outboard side of the seal assembly in fixed rotational relationship and sealed with respect to the housing, the second seal ring being located on the outboard side of the first seal and having an annular sealing face on a radial surface on the inboard side of the second seal ring;

resilient means biasing one of the first and the second sealing rings axially towards the other of the first and second sealing rings, so that the sealing face of the first seal ring sealingly engages the sealing face of the second seal ring and forms a seal between the shaft and the housing;

external circumferential surfaces of the first and the second seal rings being exposed to the process fluid in the process chamber, the seal between the sealing faces preventing leakage of the process fluid to internal peripheries of the first and the second seal rings;

an outboard seal assembly forming a seal between the shaft and the housing, the outboard seal assembly being located outboard of the inboard seal assembly and spaced axially therefrom, to define a barrier chamber which opens to the internal peripheries of the first and the second seal rings of the inboard seal assembly;

the barrier chamber having an inlet, the inlet being connected to a source of barrier fluid, the barrier fluid having a pressure that is greater than a pressure of the process fluid in the process chamber;

the external circumferential surfaces of the first and the second seal rings of the inboard seal being shielded from the process fluid in the process chamber by shroud members, the shroud members limiting communication between the process fluid and the external circumferential surfaces of the first and the second seal rings such that the process fluid communicates and transfers heat with the first and the second seal rings predominantly at outer regions thereof adjacent the sealing faces; and a sleeve formed from a thermally insulative material being secured to the internal periphery of the first and the second seal ring of the inboard seal assembly, to limit communication of the barrier fluid with the internal peripheries of the first and the second seal rings such that the barrier fluid communicates with portions of the internal peripheries of the first and the second seal rings predominantly adjacent the sealing faces; and a thermal shroud member is supported by a flange of a sleeve member and extends axially toward the outboard side of the first seal ring and another thermal shroud member is supported by a carrier ring and extends axially toward the inboard side of the second seal ring, axially adjacent ends of the shroud members have flange formations, the flange formations extend radially inward from the respective shroud member toward the respective outer surface of the first and the second seal rings.

* * * * *